(12) United States Patent
Hsu et al.

(10) Patent No.: US 10,126,487 B2
(45) Date of Patent: Nov. 13, 2018

(54) DISPLAY DEVICE

(71) Applicant: Young Lighting Technology Inc., Hsin-Chu (TW)

(72) Inventors: Sung-Chun Hsu, Hsin-Chu (TW); Jeng-Bin Hsu, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 58 days.

(21) Appl. No.: 15/158,603

(22) Filed: May 19, 2016

(65) Prior Publication Data

US 2017/0045678 A1  Feb. 16, 2017

(30) Foreign Application Priority Data

Aug. 10, 2015  (TW) .............................. 104125894 A

(51) Int. Cl.
| | |
|---|---|
| *F21V 7/04* | (2006.01) |
| *F21V 8/00* | (2006.01) |
| *G02F 1/1333* | (2006.01) |
| *G02F 1/1345* | (2006.01) |
| *G02F 1/13357* | (2006.01) |

(52) U.S. Cl.
CPC ......... *G02B 6/0088* (2013.01); *G02F 1/1336* (2013.01); *G02F 1/13452* (2013.01); *G02F 1/133308* (2013.01); *G02B 6/0083* (2013.01); *G02B 6/0091* (2013.01); *G02F 2001/133317* (2013.01)

(58) Field of Classification Search
CPC ................. G02B 6/0088; G02F 1/1336; G02F 1/133308; G02F 2001/133317
See application file for complete search history.

(56) References Cited

U.S. PATENT DOCUMENTS

| | | | | |
|---|---|---|---|---|
| 6,295,105 B1* | 9/2001 | Lee | ...................... | G02B 6/0031 |
| | | | | 349/65 |
| 2002/0154474 A1* | 10/2002 | Merz | ..................... | G06F 1/1616 |
| | | | | 361/679.6 |
| 2010/0165244 A1* | 7/2010 | Shin | .................. | G02F 1/133308 |
| | | | | 349/62 |

(Continued)

FOREIGN PATENT DOCUMENTS

| | | | |
|---|---|---|---|
| CN | 201210079121 | * | 10/2012 |
| TW | 200630682 | | 9/2006 |

(Continued)

OTHER PUBLICATIONS

English machine translation of CN 201210079121.*
"Office Action of Taiwan Counterpart Application", dated Jul. 25, 2016, p. 1-p. 7.

*Primary Examiner* — Evan Dzierzynski
(74) *Attorney, Agent, or Firm* — JCIPRNET

(57) ABSTRACT

A display device having an exterior surface and including a back cover, a frame, a display panel and a backlight module is provided. The frame is assembled to the back cover and has a first supporting portion and a second supporting portion. The display panel is disposed in the frame, wherein the first supporting portion supports the display panel. The backlight module is disposed in the frame and located between the back cover and the display panel, wherein the second supporting portion supports the backlight module. The frame has a side surface, and the side surface is a portion of the exterior surface.

17 Claims, 11 Drawing Sheets

(56) References Cited

U.S. PATENT DOCUMENTS

2015/0146136 A1\* 5/2015 Chang ............... G02F 1/133308
  349/65

FOREIGN PATENT DOCUMENTS

| TW | 200817783 | 4/2008 |
| TW | 200914933 | 4/2009 |
| TW | 201219921 | 5/2012 |
| TW | 201241512 | 10/2012 |
| TW | 201407228 | 2/2014 |
| WO | 2014065064 | 5/2014 |

\* cited by examiner

DISPLAY DEVICE

CROSS-REFERENCE TO RELATED APPLICATION

This application claims the priority benefit of Taiwan application serial no. 104125894, filed on Aug. 10, 2015. The entirety of the above-mentioned patent application is hereby incorporated by reference herein and made a part of this specification.

BACKGROUND

1. Field of the Invention

The invention generally relates to a display device, and more particularly, to a display device with a backlight module.

2. Description of Related Art

With the increasingly developments of the semiconductor industry and related electronic industries, smart phones, notebooks, tablet PC, and digital display devices are all developing toward a more convenient, versatile, and aesthetically appearance direction. When using these products, a display screen is an indispensable interface, wherein, liquid crystal displays (LCD) have become the main stream for display screens. Due to the reason that the LCD panel does not emit light inherently, a backlight module needs to be arranged under the LCD panel, to provide the light necessary for displaying image.

In general, a display requires to be additionally configured with a back plate and a plastic frame on a main frame thereof for assembling the backlight module and the display panel, and be additionally configured with a side frame on the main frame for serving as an exterior component; however, excessive components will increase an overall thickness of the display and causes the border width unable to be effectively reduced, thereby being non-advantageous for a thin, light and narrow-frame design of the display. In addition, the display requires to use an electronic control board to control the display panel, the electronic control panel and the display panel are generally disposed at a same side of the plastic frame, and the electronic control board extends from the display panel towards the side of the display, so that the plastic frame also have to extend towards the side of the display to support the electronic control panel, and thus a border width of the display is increased.

The information disclosed in this "BACKGROUND" section is only for enhancement of understanding of the background of the described technology and therefore it may contain information that does not form the prior art that is already known to a person of ordinary skill in the art. Further, the information disclosed in the "BACKGROUND" section does not mean that one or more problems to be resolved by one or more embodiments of the invention were acknowledged by a person of ordinary skill in the art.

SUMMARY

The invention is directed to a display device being advantageous for a thin, light and narrow-frame design.

The other purposes and advantages of the invention may be further understood from the technical features of the disclosures of the invention.

For achieving the foregoing at least one of the purposes or the other purposes, in one embodiment of the invention, a display device having an exterior surface is provided. The display device includes a back cover, a frame, a display panel and a backlight module. The frame is assembled to the back cover and has a first supporting portion and a second supporting portion. The display panel is disposed inside the frame, wherein the first supporting portion supports the display panel. The backlight module is disposed inside the frame and located between the back cover and the display panel, wherein the second supporting portion supports the backlight module. The frame has a side surface, and the side surface is a portion of the exterior surface.

Based on the foregoing descriptions, the embodiments of the invention have at least one of the advantages below. In the display device of the invention, the frame supports the display panel and the backlight module respectively with the first supporting portion and the second supporting portion thereof, and the side surface of the frame is indeed the exterior surface of the display device. Accordingly, the display device of the invention, unlike the traditional display device, does not require to be additionally disposed with a plastic frame for assembling the display panel and the backlight module, and also does not require to be additionally disposed with a side frame for serving as an exterior component, and thus the number of components in the display device can be reduced, thereby being advantageous for the thin, light and narrow-frame design of the display device.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
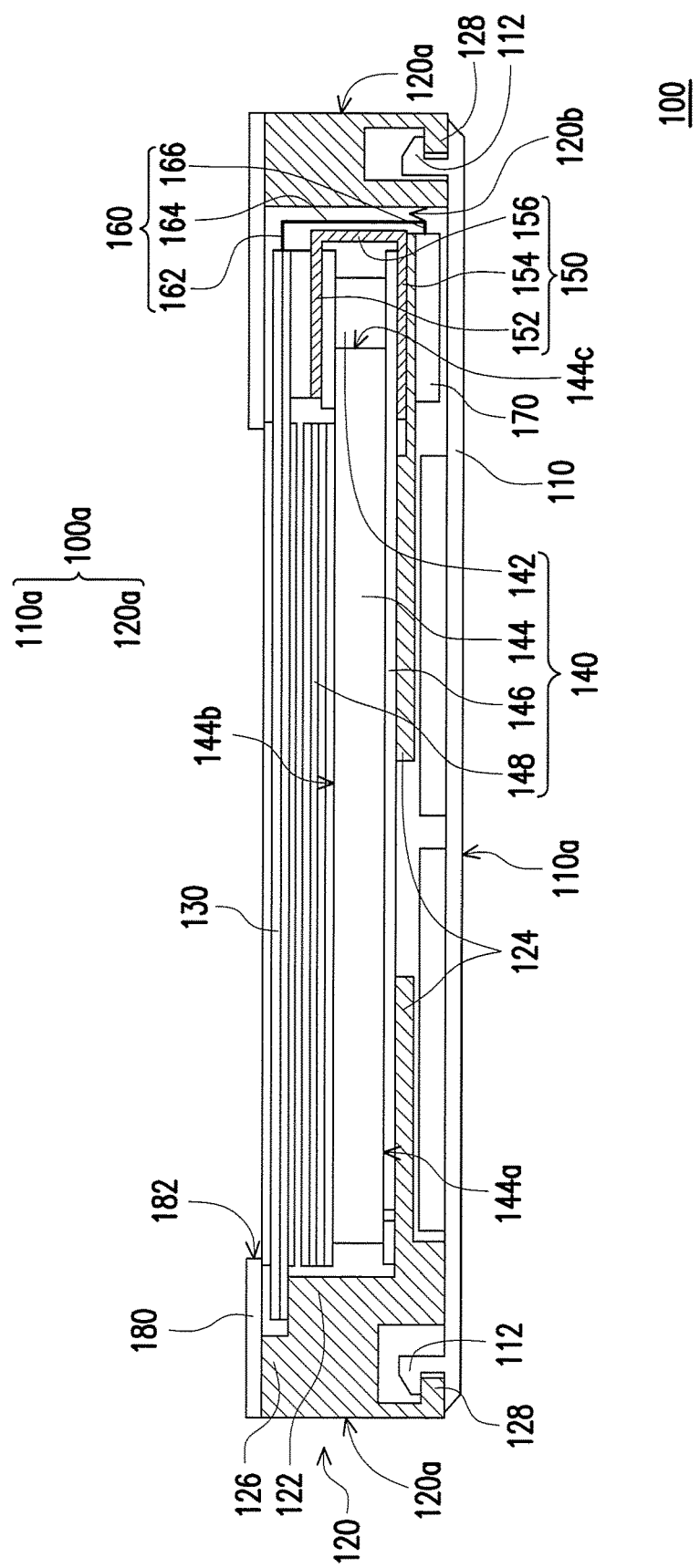
FIG. 1 is a cross-sectional diagram illustrating a display device according to of a first embodiment of the invention.

FIG. 1 is a cross-sectional diagram illustrating a display device 100 according to of a first embodiment of the invention. Referring to FIG. 1, the display device 100 of the present embodiment has an exterior surface 100a, and the display device 100 includes a back cover 110, a frame 120, a display panel 130 and a backlight module 140. The back cover 110 has a surface 110a. The frame 120 is assembled to the back cover 110 and has a first supporting portion 122, a second supporting portion 124 and at least one side surface 120a (two are illustrated in FIG. 1). The side surfaces 120a of the frame 120 are a portion of the exterior surface of the display device 100. The side surfaces 120a of the frame 120 are adjacent to the surface 110a of the back cover 110, and the side surfaces 120a and the surface 110a are both being at least a portion of the exterior surface 100a. the display panel 130 is, for example, a liquid crystal display panel and is disposed inside the frame 120, and the first supporting portion 122 of the frame 120 supports the display panel 130. The backlight module 140 is disposed inside the frame 120 and located between the back cover 110 and the display panel 130, and the second supporting portion 124 of the frame 120 supports the backlight module 140.

As described in the above, the frame 120 supports display panel 130 and the backlight module 140 respectively with the first supporting portion 122 and the second supporting portion 124 thereof, and the side surfaces 120a of the frame 120 are a portion of the exterior surface 100a of the display device 100. Accordingly, the display device 100, unlike the traditional display device, does not require to be additionally disposed with a plastic frame and a back plate for assembling the display panel and the backlight module, and also does not require to be additionally disposed with a side frame for serving as an exterior component, and thus the number of components in the display device 100 can be reduced, thereby being advantageous for the thin, light and narrow-frame design of the display device 100.

In the present embodiment, the display device 100 includes a flexible printed circuit 160 and a control element 170, the control element 170 is, for example, an electronic control board for controlling the display panel 130, the frame 120 has a gap 120b, and a width of the gap 120b is not smaller than a thickness of the flexible printed circuit 160 so that the flexible printed circuit 160 can pass through the gap 120b. By forming the gap 120b in the frame 120, the display panel 130 and the control element 170 can be respectively disposed at two opposite sides of the second supporting portion 124, and the flexible printed circuit 160 passing through the gap 120b can be connected between the display panel 130 and the control element 170, so as to complete the installation of the flexible printed circuit 160 and the control element 170. In the present embodiment, since the second supporting portion 124 supports the backlight module, the control element 170 is disposed between the second supporting portion 124 and the back cover 110 through a bending of the flexible printed circuit 160, so that the control element 170 does not have to extend from the display panel 130 towards a side of the display device 100, and thus a border width of the display device 100 is further reduced. In the following, the manners of installation for the display panel 130, the flexible printed circuit 160 and the control element 170 of the present embodiment are further described using the drawings as an example.

Figure 2A:
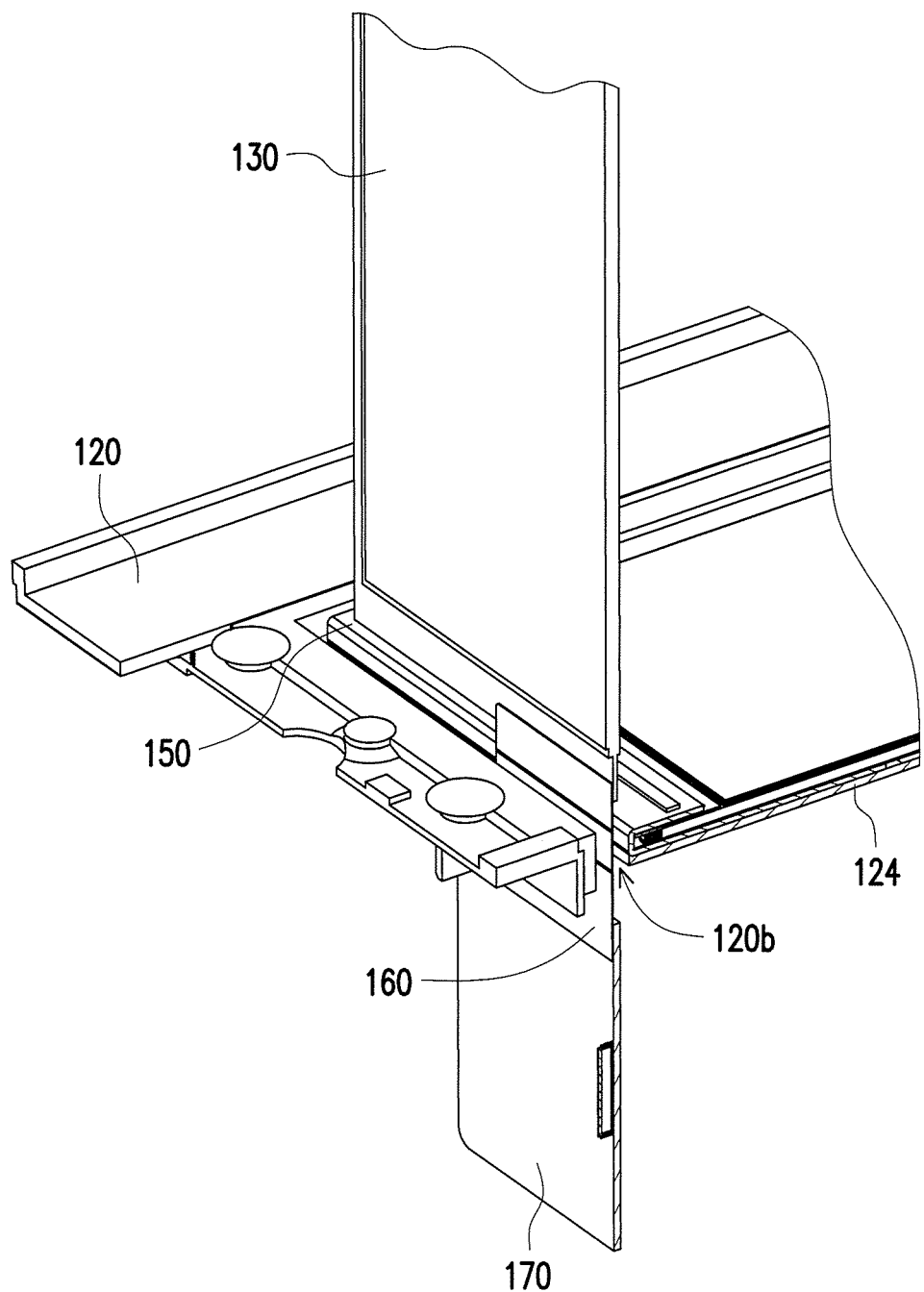
FIG. 2A and FIG. 2B illustrate the manners of installation of the display panel, the flexible printed circuit and the control element of FIG. 1.
Figure 2B:
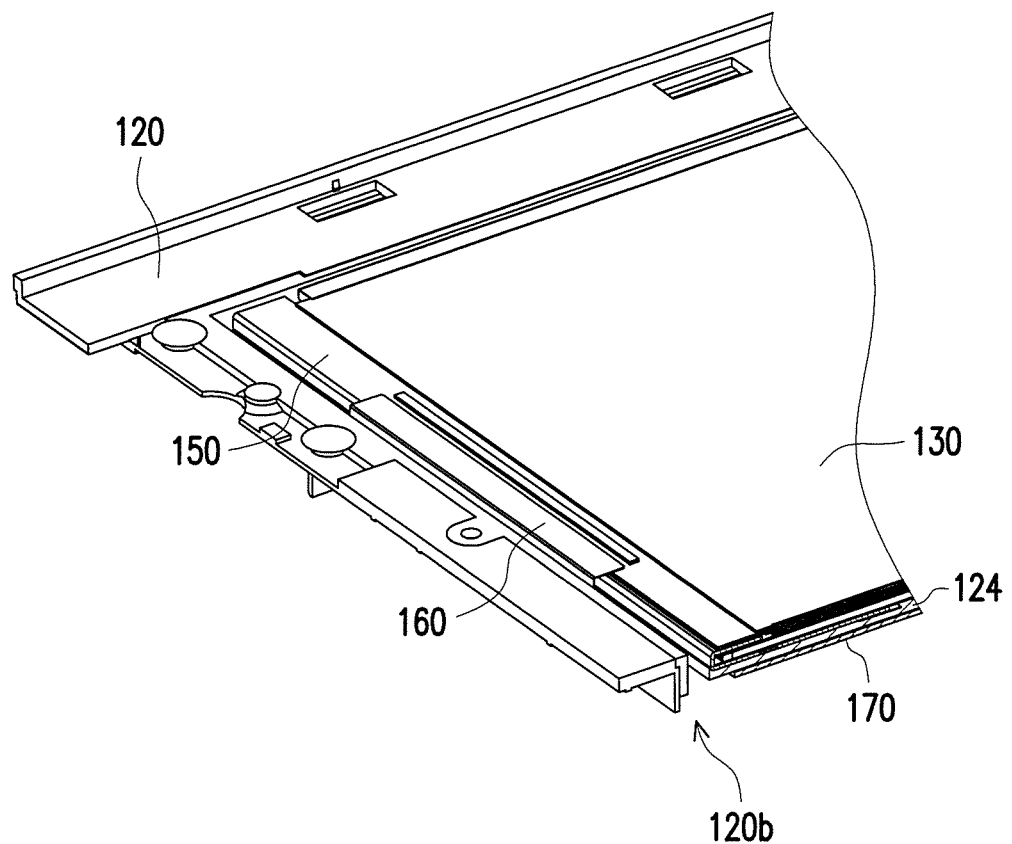

FIG. 2A and FIG. 2B illustrate the manners of installation of the display panel, the flexible printed circuit and the control element of FIG. 1. Firstly, as shown in FIG. 2A, the flexible printed circuit 160 may be configured to pass through the gap 120b of the frame 120. Next, the flexible printed circuit 160 is bent to a state as shown in FIG. 2B, so that the display panel 130 and the control element 170 are respectively disposed at the two opposite sides of the second supporting portion 124. Further, in the present embodiment, a width of the gap 120b is, for example, designed to be not smaller than a thickness of the display panel 130, so that the display panel 130 and the flexible printed circuit 160 sequentially pass through the gap 120b from top-to-bottom and form into the states as shown in FIG. 2A. In addition, the width of the gap 120b is, for example, designed to be not smaller than a thickness of the control element 170, so that the control element 170 and the flexible printed circuit 160 sequentially pass through the gap 120b from top-to-bottom and form into the states as shown in FIG. 2A. Otherwise, the width of the gap 120b is, for example, designed to be not smaller than a thickness of the flexible printed circuit 160, so that the flexible printed circuit 160 may firstly pass through the gap 120b, then connect with the display panel 130 and the control element 170, respectively and thereby form into the state as shown in FIG. 2A, or the flexible printed circuit 160 having one end already connected to one of the display panel 130 and the control element 170 may firstly pass through the gap 120b before another end thereof is connected to the another one of the display panel 130 and the control element 170 and thereby form into the state as shown in FIG. 2A.

Referring to FIG. 1, the backlight module 140 of the present embodiment includes a light source 142, a light guide plate 144, a reflective sheet 146 and an optical film set 148. The light guide plate 144 has a back surface 144a and a light emitting surface 144b opposite to each other, and has a light incident surface 144c connecting the back surface 144a and the light emitting surface 144b. The reflective sheet 146 and the optical film set 148 are respectively disposed at the back surface 144a and the light emitting surface 144b, and the light source 142 is, for example, a light emitting diode (LED) light source disposed at the light incident surface 144c. The second supporting portion 124 of the frame 120 supports the light guide plate 144, wherein the reflective sheet 146 is located between the light guide plate 144 and the second supporting portion 124 and contacts the second supporting portion 124.

In view of the above, the display device 100 of the present embodiment further includes a cover 150, the second supporting portion 124 of the frame 120 supports the cover 150, and the cover 150 is disposed adjacent to the gap 120b of the frame 120 for covering the light source 142 of the backlight module 140. In specific, the cover 150 of the present embodiment is separated from the frame 120 and includes a first cover portion 152, a second cover portion 154 and a third cover portion 156. The first cover portion 152 and the second cover portion 154 are respectively located at two opposites sides of the light source 142, the second cover portion 154 is located between the light source 142 and the second supporting portion 124, two ends of the third cover portion 156 are respectively connected to the first cover portion 152 and the second cover portion 154, and the third cover portion 156 is adjacent to the gap 120b of the frame 120.

In the present embodiment, the flexible printed circuit 160, as shown in FIG. 1, extends from the display panel 130 along an outer side of the cover 150 to the control element 170. In specific, the flexible printed circuit 160 includes a first section 162, a second section 164 and a third section 166, the first section 162 is connected to the display panel 130, the second section 164 is connected to the first section 162 and bends in relative to the first section 162 to pass through the gap 120b, and the third section 166 is connected to the second section 164 and bends in relative to the second section 164 to connect with the control element 170.

Referring to FIG. 1, the frame 120 and the back cover 110 of the present embodiment are, for example, are assembled with each other via a hook 128 and a hook 112, but the invention is not limited thereto. The frame 120 and the back cover 110 may be assembled via other proper structure and method. In addition, the display device 100 of the present embodiment further includes a front cover 180, the frame 120 further has a third supporting portion 126, the third supporting portion 126 supports the front cover 180, and the display panel 130 is located between the backlight module 140 and the front cover 180, wherein the front cover 180 is, for example, fixed at the third supporting portion 126 by means of gluing or snapping. In the present embodiment, the front cover 180 is, for example, a front frame and has an opening 182, and the opening 182 exposes the display panel 130 so as to allow a user to view an image displayed by the display panel 130.

Figure 3:
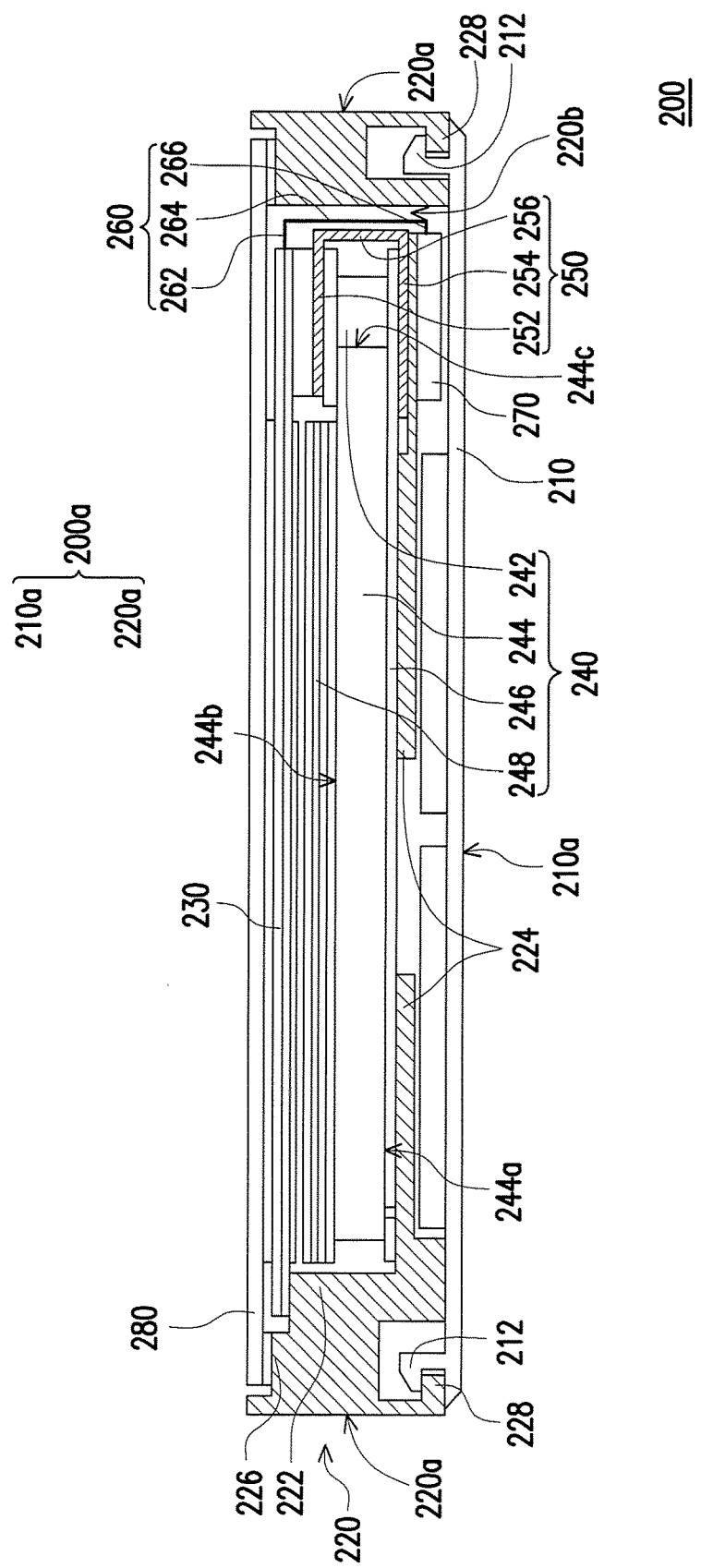
FIG. 3 is a cross-sectional diagram illustrating a display device according to of a second embodiment of the invention.

FIG. 3 is a cross-sectional diagram illustrating a display device 200 according to of a second embodiment of the invention. In the display device 200 of FIG. 3, configurations and functions of the same elements are similar to that of FIG. 1, and thus will not be repeated. A difference between the display device 200 and the display device 100 lies in that, the front cover 280 of the display device 200 is not a front frame, such that the front cover 280 is a transparent cover and covers the display panel 230. For instance, the transparent cover may be a transparent protective plate having no touch function or a touch panel with touch function, but the invention is not limited thereto.

Figure 4:
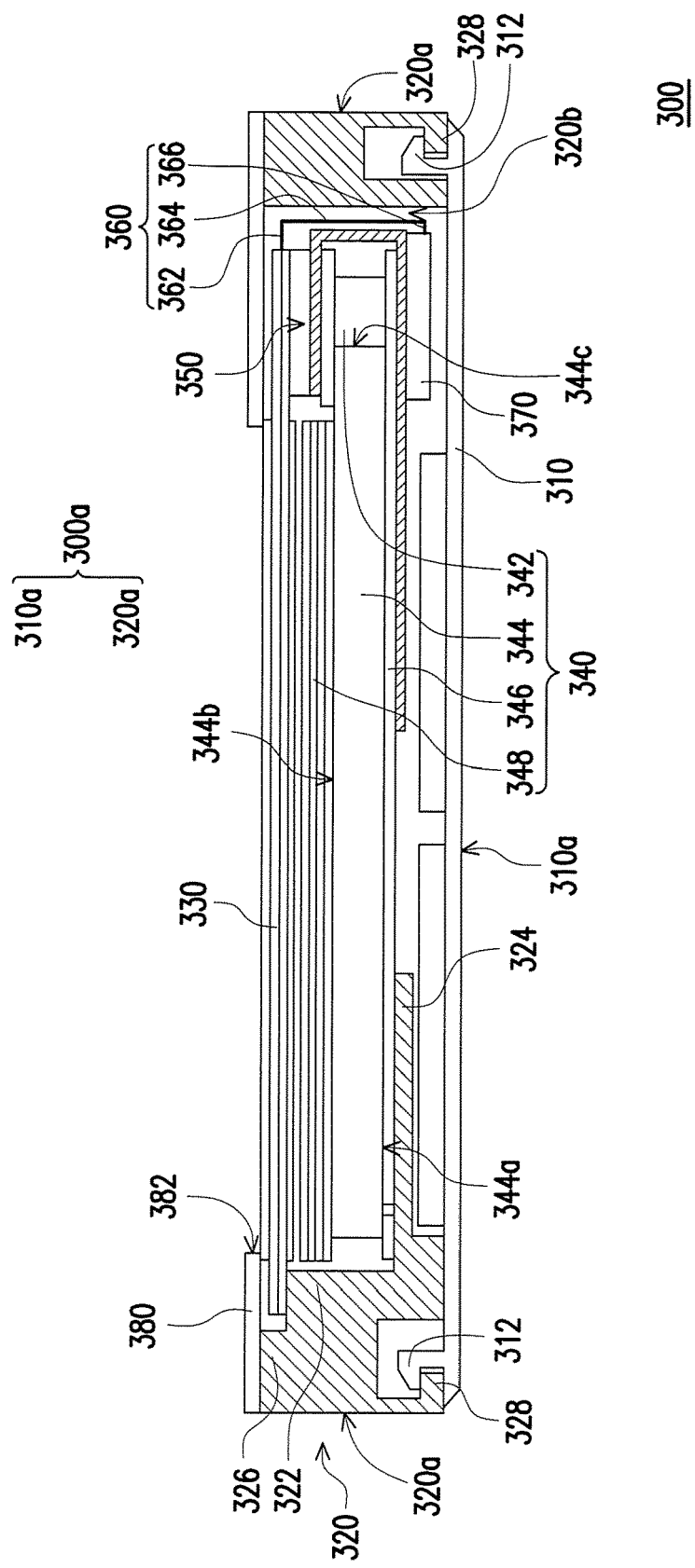
FIG. 4 is a cross-sectional diagram illustrating a display device according to of a third embodiment of the invention.

FIG. 4 is a cross-sectional diagram illustrating a display device 300 according to of a third embodiment of the invention. In the display device 300 of FIG. 4, configurations and functions of the same elements are similar to that of FIG. 1, and thus will not be repeated. A difference between the display device 300 and the display device 100 lies in that, the cover 350 is integrally connected with the frame 320, so that the number of components in the display device 300 can further be reduced.

Figure 5:
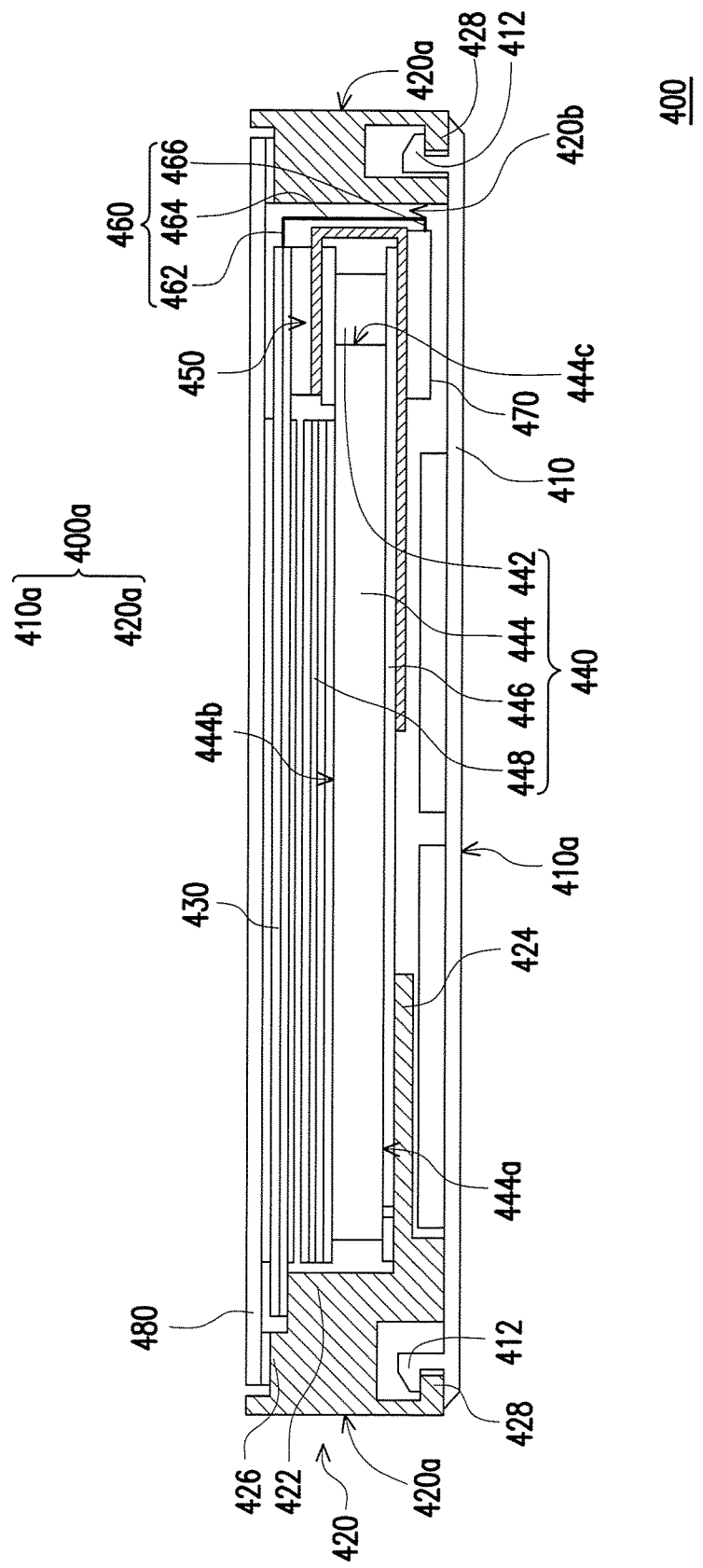
FIG. 5 is a cross-sectional diagram illustrating a display device according to of a fourth embodiment of the invention.

FIG. 5 is a cross-sectional diagram illustrating a display device 400 according to of a fourth embodiment of the invention. In the display device 400 of FIG. 5, configurations and functions of the same elements are similar to that of FIG. 3, and thus will not be repeated. A different between the display device 400 and the display device 200 lies in that, the cover 450 is integrally connected with the frame 420, so that the number of components in the display device 400 can further be reduced.

Figure 6:
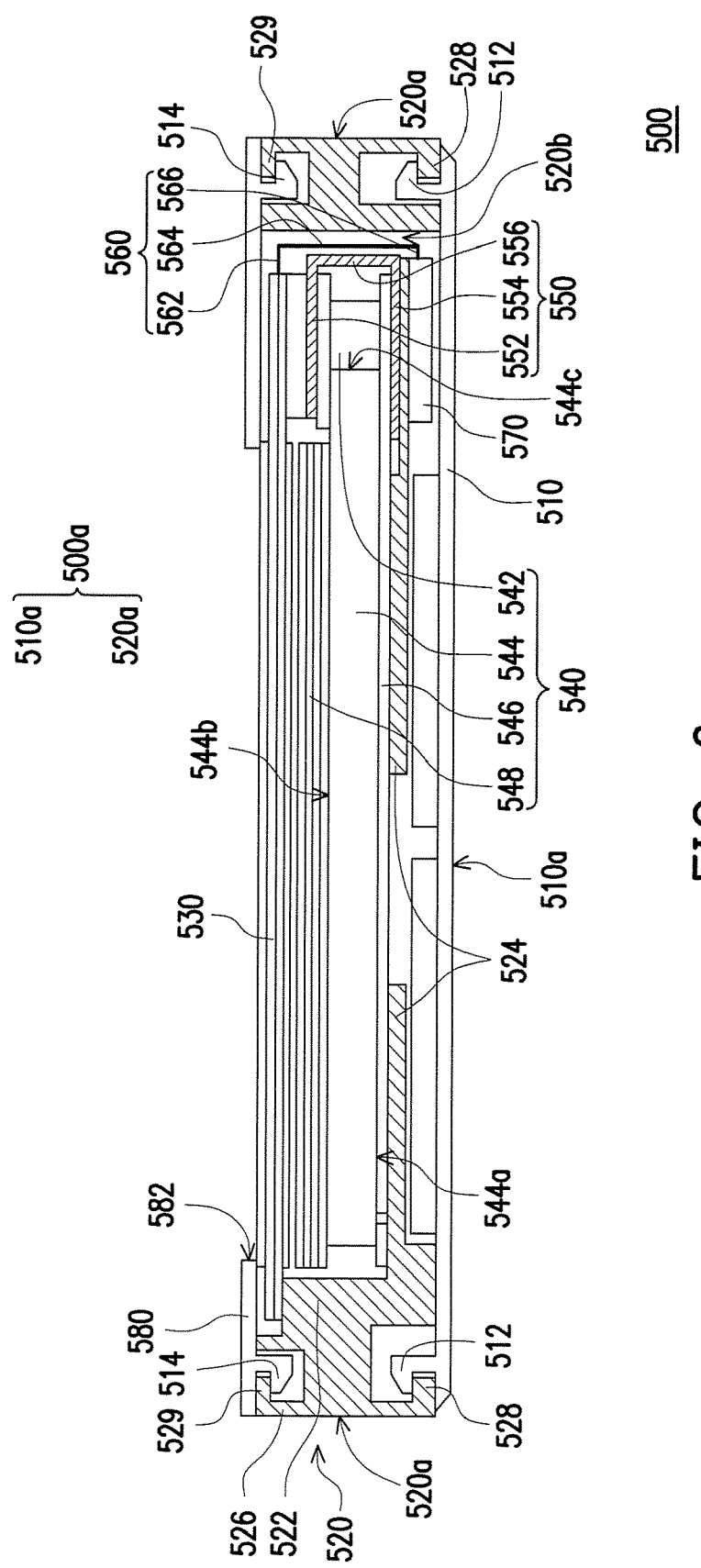
FIG. 6 is a cross-sectional diagram illustrating a display device according to of a fifth embodiment of the invention.

FIG. 6 is a cross-sectional diagram illustrating a display device 500 according to of a fifth embodiment of the invention. In the display device 500 of FIG. 6 configurations and functions of the same elements are similar to that of FIG. 1, and thus will not be repeated. A different between the display device 500 and the display device 100 lies in that, the front cover 580 and the frame 520 are assembled with each other via the hook 529 and the hook 514, but the invention is not limited thereto. The front cover 580 and the frame 520 may be assembled via other proper structure and method.

Figure 7:
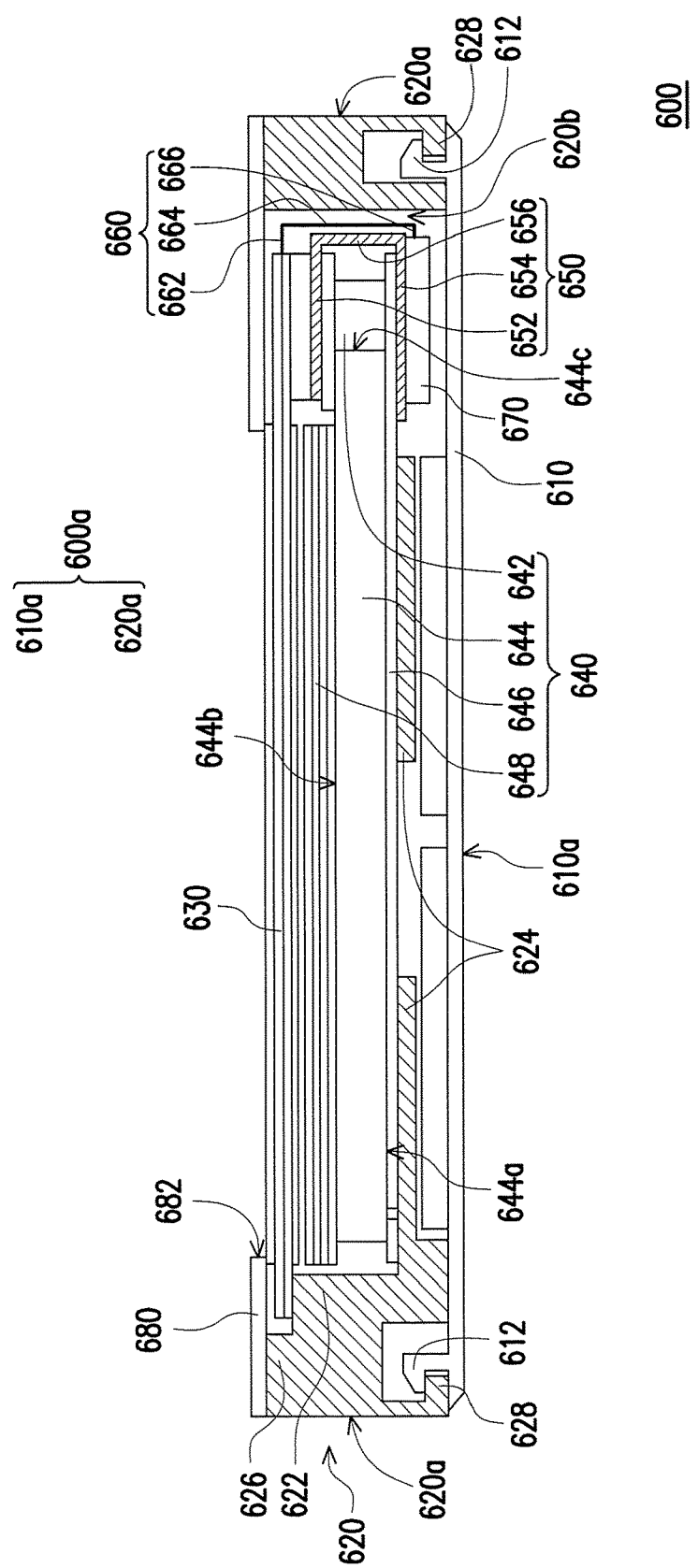
FIG. 7 is a cross-sectional diagram illustrating a display device according to of a sixth embodiment of the invention.
Figure 8A:
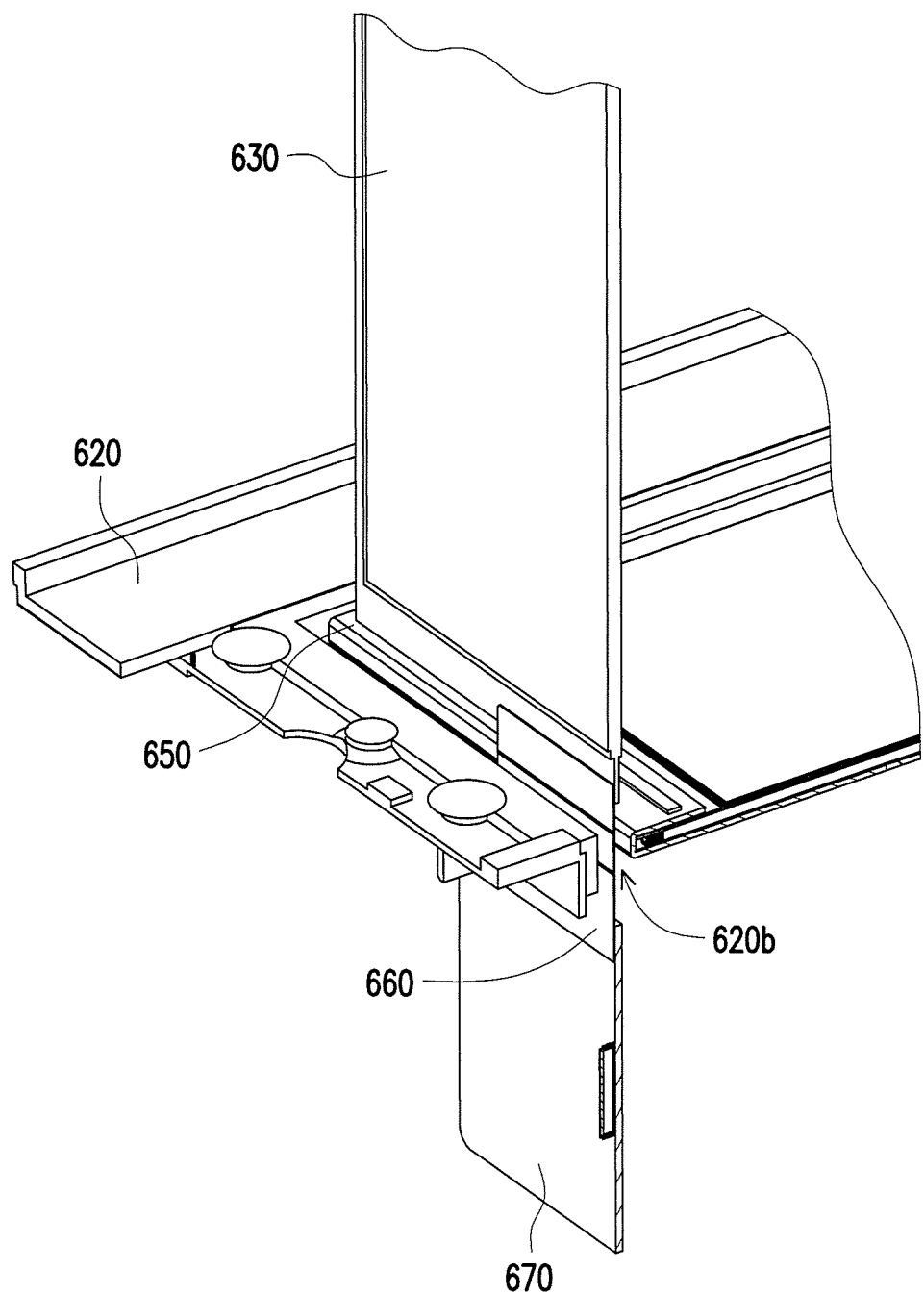
FIG. 8A and FIG. 8B illustrate the manners of installation of the display panel, the flexible printed circuit and the control element.
Figure 8B:
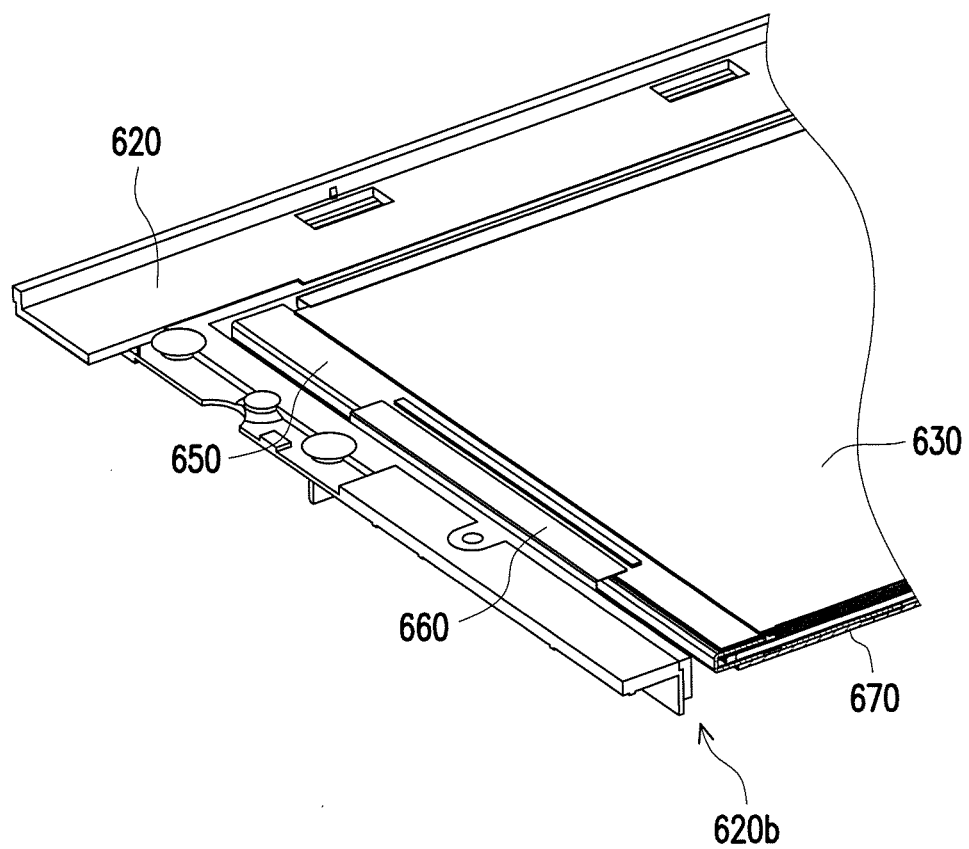

FIG. 7 is a cross-sectional diagram illustrating a display device 600 according to of a sixth embodiment of the invention. In the display device 60 of FIG. 7, configurations and functions of the same elements are similar to that of FIG. 1, and thus will not be repeated. A different between the display device 600 and the display device 100 lies in that, the second supporting portion 624 forms an space therein by being partially hollow, and the control element 670 is located in the space. In the present embodiment, the second supporting portion 624 is partially hollow at where the cover 650 is being supported, but the invention is not limited thereto. The second supporting portion 624 may also be partially hollow at other position, so as to accommodate the control element 670. As compared to FIG. 1, the display device 600 uses the partial portion of the second supporting portion 624 to accommodate the control element 670, so as to effectively reduce the thickness of the display device 600. FIG. 8A and FIG. 8B illustrate the manners of installation of the display panel, the flexible printed circuit and the control element, wherein configurations and functions of the same elements are similar to that of FIG. 2A and FIG. 2B, and thus will not be repeated.

Figure 9:
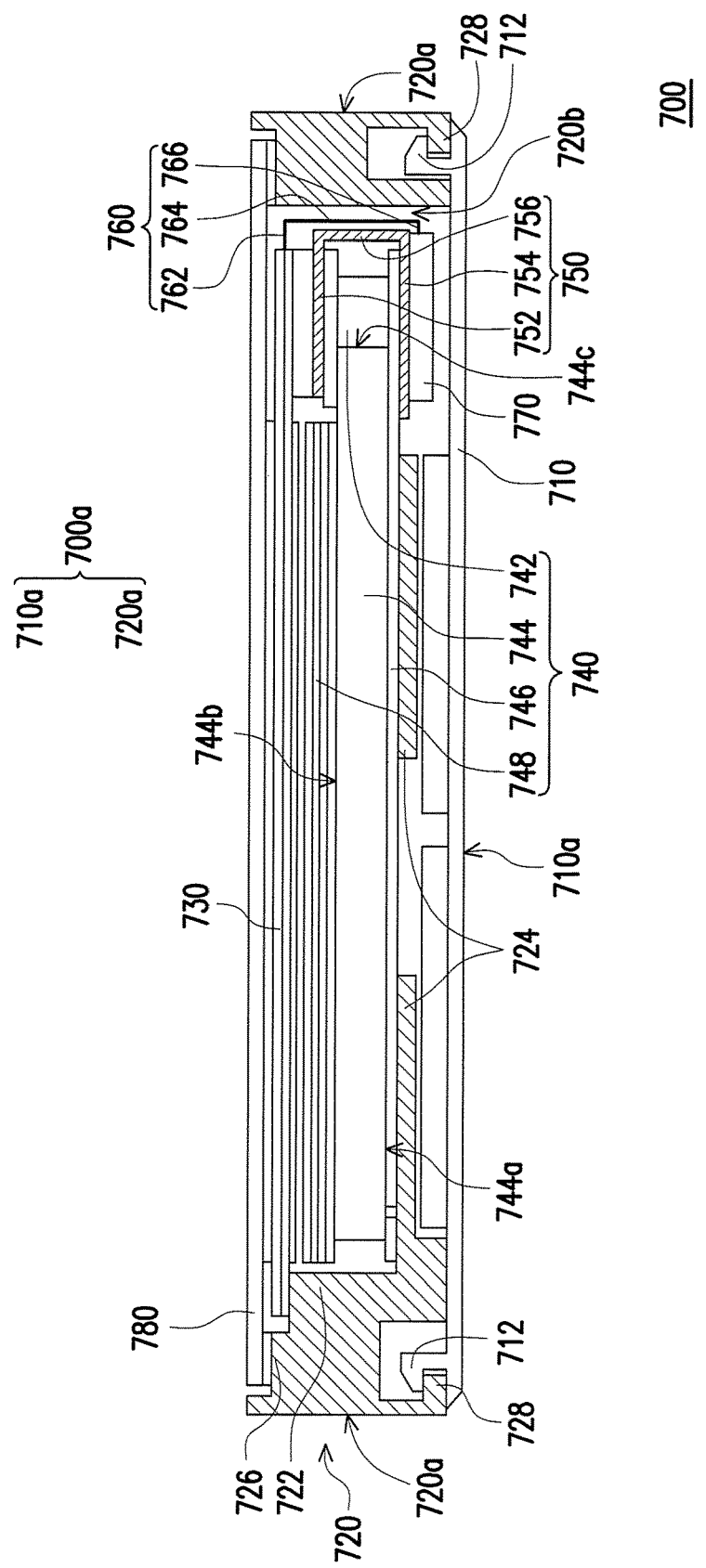
FIG. 9 is a cross-sectional diagram illustrating a display device according to of a seventh embodiment of the invention.

FIG. 9 is a cross-sectional diagram illustrating a display device 700 according to of a seventh embodiment of the invention. In the display device 700 of FIG. 9, configurations and functions of the same elements are similar to that of FIG. 6, and thus will not be repeated. A different between the display device 700 and the display device 600 lies in that, the front cover 780 of the display device 700 is not a front frame, such that the front cover 780 is a transparent cover and covers the display panel 730.

In summary, the embodiments of the invention have at least one of the advantages below. In the display device of the invention, the frame supports the display panel and the backlight module respectively with the first supporting portion and the second supporting portion thereof, and the side surface of the frame is indeed the exterior surface of the display device. Accordingly, the display device of the invention, unlike the traditional display device, does not require to be additionally disposed with a plastic frame for assembling the display panel and the backlight module, and also does not require to be additionally disposed with a side frame for serving as an exterior component, and thus the number of components in the display device can be reduced, thereby being advantageous for the thin, light and narrow-frame design of the display device. In addition, by forming the gap in the frame, the display panel and the control element can be respectively disposed at the two opposite sides of the second supporting portion of the frame, and the flexible printed circuit passing through the gap can be connected between the display panel and the control element, so as to complete the installation of the flexible printed circuit and the control element. As a result, the control element is disposed between the second supporting portion and the back cover through the bending of the flexible printed circuit, so that the control element does not have to extend from the display panel towards a side of the display device, thereby further reducing the border width of the display device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display device, having an exterior surface, the display device comprising:
    a back cover;
    a frame, assembled to the back cover and having a first supporting portion and a second supporting portion;
    a cover, disposed inside the frame and supported by the second supporting portion, wherein the cover is separated from the frame;
    a display panel, disposed inside the frame, wherein the first supporting portion and the cover together support the display panel; and
    a backlight module, disposed inside the frame and located between the back cover and the display panel, wherein the second supporting portion supports the backlight module,
    wherein the frame has a side surface, and the side surface is a portion of the exterior surface.

2. The display device as recited in claim 1, wherein the backlight module comprises a light source and a light guide plate, the second supporting portion supports the light guide plate, the light source is disposed at a light incident surface of the light guide plate, and the cover covers the light source.

3. The display device as recited in claim 2, comprising a flexible printed circuit and a control element, wherein the display panel and the control element are respectively located at two opposite sides of the light guide plate, the frame has a gap, and the flexible printed circuit is configured to pass through the gap and extends from the display panel along an outer side of the cover to the control element.

4. The display device as recited in claim 3, wherein the cover is disposed adjacent to the gap.

5. The display device as recited in claim 4, wherein the second supporting portion has a space by being partially hollow, and the control element is located in the space.

6. The display device as recited in claim 4, wherein the cover comprises a first cover portion, a second cover portion and a third cover portion, the first cover portion and the second cover portion are respectively located at the two opposite sides of the light source, the second cover portion is located between the light source and the second supporting portion, two ends of the third cover portion are respectively connected to the first cover portion and the second cover portion, and the third cover portion is adjacent to the gap.

7. The display device as recited in claim 3, wherein the flexible printed circuit comprises a first section, a second section and a third section, the first section connects the display panel, the second section connects the first section and bends in relative to the first section to pass through the gap, the third section connects the second section and bends in relative to the second section to connect with the control element.

8. The display device as recited in claim 3, wherein a width of the gap is not smaller than a thickness of the flexible printed circuit.

9. The display device as recited in claim 3, wherein a width of the gap is not smaller than a thickness of the display panel.

10. The display device as recited in claim 3, wherein a width of the gap is not smaller than a thickness of the control element.

11. The display device as recited in claim 3, wherein the control element is located between the second supporting portion and the back cover.

12. The display device as recited in claim 1, comprising a front cover, wherein the frame has a third support-portion, the third supporting portion supports the front cover, and the display panel is located between the backlight module and the front cover.

13. The display device as recited in claim 12, wherein the front cover is a transparent cover and covers the display panel.

14. The display device as recited in claim 12, wherein the front cover is a front frame and has an opening, and the opening exposes the display panel.

15. The display device as recited in claim 1, comprising a front cover, wherein the front cover is assembled to another side of the frame opposite to the back cover, the front cover has an opening, and the opening exposes the display panel.

16. A display device, having an exterior surface, the display device comprising:
- a back cover;
- a frame, assembled to the back cover and having a first supporting portion and a second supporting portion, wherein the frame has a side surface, and the side surface is a portion of the exterior surface;
- a cover, disposed inside the frame and supported by the second supporting portion;
- a display panel, disposed inside the frame, wherein the first supporting portion and the cover together support the display panel;
- a backlight module, disposed inside the frame and located between the back cover and the display panel, wherein the second supporting portion supports the backlight module, and the backlight module comprises a light source and a light guide plate, wherein the second supporting portion supports the light guide plate, the light source is disposed at a light incident surface of the light guide plate, and the cover covers the light source; and
- a flexible printed circuit and a control element, wherein the display panel and the control element are respectively located at two opposite sides of the light guide plate, the frame has a gap, and the flexible printed circuit is configured to pass through the gap and extends from the display panel along an outer side of the cover to the control element.

17. The display device as recited in claim 16, wherein the cover is integrally connected with the frame.

* * * * *